2,731,310

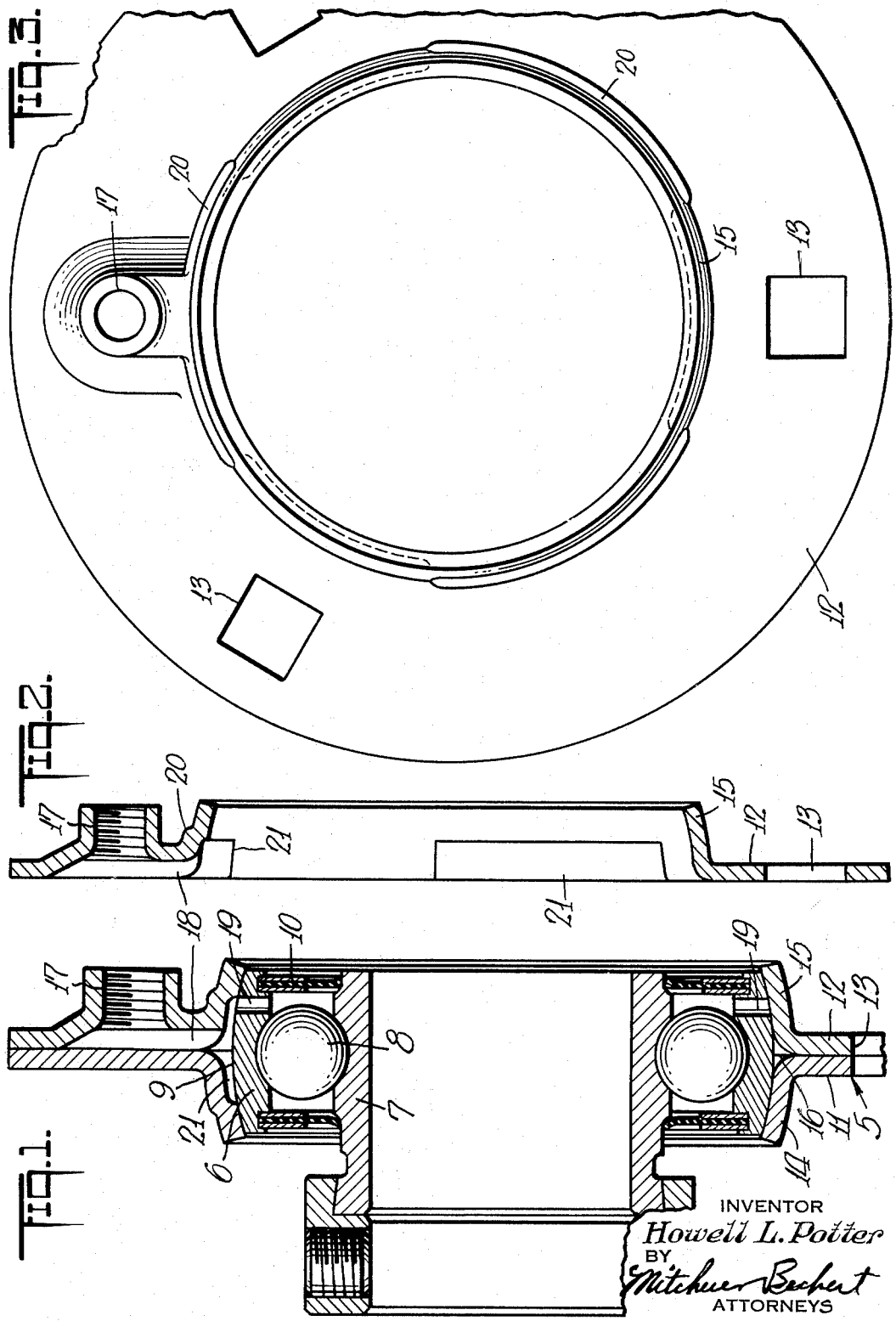

BEARING LUBRICATION MEANS

Howell L. Potter, New Britain, Conn., assignor to The Fafnir Bearing Company, New Britain, Conn., a corporation of Connecticut Application February 12, 1954, Serial No. 409,991

6 Claims. (Cl. 308—187)

My invention relates to a bearing lubrication means, and particularly to a bearing housing having built in lubrication means for an anti-friction bearing.

It is an object to provide an improved lubrication means for an anti-friction bearing held in a housing.

Another object is to provide a bearing housing for adequately supporting a bearing and at the same time providing circumferential passageway means of introducing lubricant through an aperture in the bearing ring housed in the housing.

It is another object to provide improved bearing housing having integral lubricant passage means therein, which is simple and cheap to manufacture and effective in use.

Other objects and various features of novelty and improvement will be hereinafter pointed out or will become apparent to those skilled in the art.

Briefly stated, in a preferred form of the invention, I employ a bearing housing for housing an anti-friction bearing, the housing having a plurality of spaced-apart segmental lubricant passages to conduct lubricant to and through an aperture in the outer bearing ring to the interior of the bearing. The lubricant passage means in the housing are so arranged that the bearing ring is adequately supported, and at the same time there is a free passage for lubricant to the aperture extending through the outer bearing ring. The spaced-apart lubricant passages are preferably three in number, each extending over an arc of about 60° so that the 60° lands between the lubricant passages fit the outer bearing ring snugly and give adequate support thereto.

The housing is preferably formed of two housing members, which may be flat sheets having outwardly extending circumferential flanges forming the housing in which the bearing is housed. The space between the outer surface of the outer bearing ring and the two plates and their flanges is in the form of a triangular space which extends circumferentially about the bearing and housing and constitutes a continuous lubricant passage. Means for introducing the lubricant to said continuous passage is provided and this continuous lubricant passage is connected to the spaced-apart segmental passages heretofore noted.

In the drawings, which show, for illustrative purposes only, a preferred form of the invention:

Fig. 1 is a central axial sectional view of a bearing and housing illustrating my invention;

Fig. 2 is an axial sectional view through one housing part shown in Fig. 1; and

Fig. 3 is an axial view in elevation of the housing member shown in Fig. 2.

In the specific form shown, I employ a bearing housing 5 for an anti-friction bearing, which latter may comprise an outer ring 6, an inner ring 7 with interposed anti-friction bearing members such as balls 8. The outer surface of the ring 6 may be of generally spherical form, or of self-aligning type, as indicated at 9. Seals of any suitable form 10 may serve to seal the lubricant in the bearing and to prevent the entry of foreign matter.

The housing 5, in the specific form shown, consists of two plates 11 and 12 in face-to-face abutting relationship, and these plates are provided with apertures 13, preferably angular in form, for receiving carriage bolts or the like for securing the assembly to a support. The plates 11—12 are provided with a housing part in the form of generally axially, outwardly extending, circumferential flanges 14—15, and these flanges are preferably formed on the inside so as to correspond to the shape of the outer ring, in this case generally spherical.

It will be seen that, where the two plates come together at the center, there is formed a generally triangular space or passage 16 defined by the plates, flanges and outer ring, and this space 16 is circumferentially continuous and is utilized as a lubricant passage. One of the plates, in this case the plate 12, is provided with a struck-up boss 17 and channel 18 for receiving lubricant and conducting it to the continuous generally triangular lubricant passage 16.

The outer ring 6 is provided with lubricant passage means, preferably in the form of two holes 19 extending therethrough. These holes are preferably located 180° apart, and these holes are located axially to one side of the raceway groove in the outer ring. In order to introduce lubricant from the continuous passage 16 into one or the other of the holes 19 through the outer ring, I provide additional lubricant passage means in one or both of the housing members.

In the specific form illustrated, both plates are formed, as shown particularly in Figs. 2 and 3, with a plurality—in this case three—of struck-up portions 20 which provide lubricant passages 21—21, which are in the form of segmental or arcuate passages of about 60° extent. The housing surface or land between the passages 21 fit the outer bearing ring 6 snugly and support the same adequately, as shown at the lower part of Fig. 1, while the region of the lubricant passages 21 provide a free space about the circumference of the outer ring. These passages 21 extend from the continuous passage 16 generally radially outwardly toward, but terminate considerably short of, the ends of flanges 14—15. Thus, the outer bearing ring is supported continuously at both ends and the intermediate section of the ring between the ends is supported by about one half of the total circumferential housing surface.

The passages 21 are of such axial extent, in relation to the holes 19 through the bearing, that lubricant may always pass from the continuous passage 16 through one of the passages 21 to one of the holes 19 and into the interior of the bearing. It will be seen that, with three symmetrical passages 21 of about 60° angular extent, and with two holes 19, 180° apart, one of the holes will always be in lubricant communication with one of the passages 21. I have shown both housing plates as provided with passages 21, so that the bearing may be reversed end for end to meet the requirements of any particular situation, and lubrication is thus assured with the two holes 19 in the ring, regardless of which way the ring is positioned in the housing.

It will be seen that my improved housing is very simple in construction and is preferably formed of a pair of stampings. The space between the outer ring and the two housing plates forms a continuous lubricant passage and other passages are pressed into the housing flanges and communicate with the continuous passage so as to assure lubrication of the bearing. The bearing, while having a continuously open passage to a source of lubricant, is adequately supported at both ends completely circumferentially and at an intermediate portion by about half of the total bearing supporting space in the housing. Thus the bearing is at all times adequately and completely supported in the housing and good lubrication is assured.

While the invention has been described in considerable detail, and a preferred form illustrated, it is to be understood that changes and modifications may be made within the scope of the invention as defined in the appended claims.

I claim:
1. In a device of the character indicated, a housing for an anti-friction bearing, comprising a housing member having a bearing cavity, a bearing in said bearing cavity and including outer and inner bearing rings and interposed anti-friction bearing members, said outer ring fitting in said housing cavity, said cavities having a plurality of circumferentially spaced apart enlargements forming with said outer ring spaced apart lubricant chambers, said chambers terminating short of the ends of said cavity, whereby said outer ring is supported by said cavity wall outwardly of said chambers and by said cavity wall intermediate said chambers, a generally circumferentially extending lubricant passage communicating with said lubricant chambers, and apertures extending through said outer bearing ring and spaced circumferentially so that at least one aperture will always communicate with one of said lubricant chambers.

2. In a device of the character indicated, a housing for an anti-friction bearing comprising a housing means having a bearing cavity therein, an anti-friction bearing in said cavity, said bearing including an outer bearing ring fitting in said cavity and an inner bearing ring with anti-friction bearing members between said rings, said bearing cavity having a plurality of circumferentially spaced enlargements forming with said outer ring a plurality of spaced lubricant chambers, said enlargements and chambers terminating short of the axial ends of said cavity whereby said outer ring has a continuous bearing surface in said cavity adjacent the ends thereof and between said enlargements, a circumferentially extending lubricant passage means communicating with said chambers, said outer ring in said cavity having aperture means therethrough and communicating with at least one of said lubricant chambers.

3. In the combination defined in claim 2, said lubricant chambers being three in number substantially equally spaced, each chamber being of a size circumferentially substantially equal to the circumferential space between said chambers.

4. In the combination defined in claim 3, said aperture means in said outer ring comprising two apertures spaced substantially 180° apart.

5. In a device of the character indicated, a pair of housing plates in face to face relationship, each plate having an annular flange extending outwardly therefrom and forming a housing for an anti-friction bearing, a bearing in said housing and comprising an outer bearing ring fitting in said housing, an inner bearing ring and interposed anti-friction bearing members, said plates and flanges and said outer ring defining a circumferentially extending lubricant passage, at least one of said flanges having a plurality of cavities formed on the inner side thereof, said cavities being spaced apart circumferentially and being open to said lubricant passage and terminating in an axial direction short of the outer edge of the flange whereby said outer ring is supported by said flange axially outwardly of said cavities and by said flanges between said cavities, said outer ring having at least one hole therethrough and communicating with one of said cavities.

6. In a device of the character indicated, a housing for an anti-friction bearing, comprising a housing means having a bearing cavity therein, an anti-friction bearing in said cavity, said bearing including an outer bearing ring fitting said cavity and an inner ring with interposed anti-friction bearing elements, said cavity having an odd number of enlargements in the inner wall and with said outer ring forming lubricant chambers, lubricant passage means to said chambers, said chambers each being of circumferential extent substantially equal to the circumferential spaces between said chambers, said outer ring having two apertures therethrough at substantially 180° apart.

References Cited in the file of this patent

UNITED STATES PATENTS

| 2,566,080 | Davids | Aug. 28, 1951 |
| 2,653,064 | Heim | Sept. 22, 1953 |

FOREIGN PATENTS

| 124,147 | Australia | May 8, 1947 |
| 562,391 | Great Britain | June 29, 1944 |